(12) United States Patent
Ikegami et al.

(10) Patent No.: US 10,955,003 B2
(45) Date of Patent: Mar. 23, 2021

(54) SLIDING MEMBER

(71) Applicant: DAIDO METAL COMPANY LTD., Nagoya (JP)

(72) Inventors: Asako Ikegami, Inuyama (JP); Takaaki Kitahara, Inuyama (JP)

(73) Assignee: DAIDO METAL COMPANY LTD, Nagoya (JP)

(*) Notice: Subject to any disclaimer, the term of this patent is extended or adjusted under 35 U.S.C. 154(b) by 8 days.

(21) Appl. No.: 16/276,749

(22) Filed: Feb. 15, 2019

(65) Prior Publication Data

US 2019/0301529 A1 Oct. 3, 2019

(30) Foreign Application Priority Data

Mar. 27, 2018 (JP) .................................. 2018-059981

(51) Int. Cl.
| | |
|---|---|
| *B32B 15/20* | (2006.01) |
| *F16C 33/14* | (2006.01) |
| *F16C 17/02* | (2006.01) |
| *F16C 33/12* | (2006.01) |
| *F16C 33/10* | (2006.01) |

(52) U.S. Cl.
CPC .............. *F16C 33/14* (2013.01); *F16C 17/02* (2013.01); *F16C 33/121* (2013.01); *F16C 33/127* (2013.01); *F16C 33/1095* (2013.01); *F16C 33/128* (2013.01); *F16C 2204/12* (2013.01); *F16C 2204/14* (2013.01); *F16C 2204/16* (2013.01); *F16C 2204/18* (2013.01); *F16C 2204/62* (2013.01); *F16C 2204/74* (2013.01); *F16C 2220/20* (2013.01);

(Continued)

(58) Field of Classification Search
None
See application file for complete search history.

(56) References Cited

U.S. PATENT DOCUMENTS

| | | |
|---|---|---|
| 5,429,876 A | 7/1995 | Tanaka et al. |
| 2015/0267747 A1 | 9/2015 | Iwata et al. |

(Continued)

FOREIGN PATENT DOCUMENTS

| | | |
|---|---|---|
| EP | 2944708 A1 | 11/2015 |
| JP | H06-322462 A | 11/1994 |

(Continued)

OTHER PUBLICATIONS

Extended European Search Report issued in corresponding European Application No. 19162305.7, dated Sep. 5, 2019, 9 pages.

*Primary Examiner* — Seth Dumbris
*Assistant Examiner* — Kim S. Horger
(74) *Attorney, Agent, or Firm* — Snyder, Clark, Lesch & Chung, LLP

(57) ABSTRACT

Provided is a sliding member including: a back-metal layer and a sliding layer including a copper alloy. The back-metal layer includes a hypoeutectoid steel including 0.07 to 0.35 mass % of carbon and has a structure including a ferrite phase and pearlite. The back-metal layer has a high ferrite phase portion at a bonding surface between the back-metal layer and the sliding layer. A volume ratio Pc and a volume ratio Ps satisfy Ps/Pc≤0.4, where the volume ratio Pc is a volume ratio of pearlite in the structure at a center portion in a thickness direction of the back-metal layer, and the volume ratio Ps is a volume ratio of pearlite in the high ferrite phase portion.

7 Claims, 1 Drawing Sheet

(52) U.S. Cl.
CPC ...... *F16C 2300/02* (2013.01); *F16C 2360/22* (2013.01); *F16C 2361/65* (2013.01)

(56) References Cited

U.S. PATENT DOCUMENTS

2016/0160824 A1    6/2016  Iwata et al.
2016/0333932 A1*  11/2016  Iwata ...................... B32B 27/32

FOREIGN PATENT DOCUMENTS

| JP | 2002-220631 A |   | 8/2002  |
|----|---------------|---|---------|
| JP | 2002220631 A  | * | 8/2002  |
| JP | 2006-22869 A  |   | 1/2006  |
| JP | 2015183236 A  |   | 10/2015 |

* cited by examiner

SLIDING MEMBER

FIELD OF THE INVENTION

The present invention relates to a sliding member, for example used for a bearing of an internal combustion engine or an automatic transmission or for bearings of various machines. The present invention specifically relates to a sliding member including a sliding layer on a back-metal layer.

BACKGROUND ART

For a bearing device of an internal combustion engine, an automatic transmission and the like, a cylindrical or semi-cylindrical sliding bearing formed from a sliding member including a sliding layer including a copper alloy and a steel back-metal layer has been used. For example, JP 06-322462A and JP 2002-220631A each describe a sliding member including a sliding layer including a copper-lead bearing alloy or phosphor bronze. According to such a sliding member, a sliding layer including a copper alloy provides seizure resistance and wear resistance as well as a sliding property. On the other hand, a back-metal layer functions as a support of the copper alloy and provides strength to the sliding member.

During operation of the internal combustion engine or the automatic transmission, a sliding member bears a dynamic load from a counter shaft member on a sliding surface of a sliding layer. For example, for holding a sliding bearing, the bearing is fitted into a cylindrical hole of the internal combustion engine, the automatic transmission or the like, and bears a dynamic load from a rotating counter shaft member. In recent years, in order to reduce fuel consumption, weight reduction has been achieved in the internal combustion engine and the automatic transmission, and this has caused the bearing housing to have lower rigidity than before. Accordingly, during operation of the internal combustion engine, in the bearing device of the internal combustion engine and the automatic transmission connected to the internal combustion engine, the bearing housing is more likely to be elastically deformed by a dynamic load from a counter shaft member. Due to the deformation of the bearing housing, the sliding member (sliding bearing) fitted into the bearing holding hole of the bearing housing is elastically deformed in a circumferential direction. Thus, when a varying circumferential force is applied to the sliding bearing of the conventional sliding member, since there is a difference in amount of elastic deformation between the sliding layer including the copper alloy and the steel back-metal layer, shear occurs in some cases at an interface between the sliding layer and the steel back-metal layer. This may cause breakage of the sliding member.

JP 2006-22869A addresses improvement of bonding strength of a bearing alloy layer and a steel back-metal layer. According to JP 2006-22869A, a Cu—Sn—Fe-based alloy is used as a copper alloy. Through heat treatment, a Sn—Fe compound is deposited and grains of the copper alloy are made finer. Thus, the bonding strength of the bearing alloy layer and the steel back-metal layer is increased.

SUMMARY OF THE INVENTION

The technique of JP 2006-22869A can increase the bonding strength of the bearing alloy layer and the steel back-metal layer. However, the bonding strength is insufficient to prevent shear between the bearing alloy layer and the steel back-metal layer when a dynamic load is applied. Therefore, an object of the present invention is to provide a sliding member including a sliding layer more strongly bonded to a back-metal layer than a conventional sliding member.

According to an aspect of the present invention, provided is a sliding member including: a back-metal layer having a back surface and a bonding surface; and a sliding layer including a copper alloy on the bonding surface of the back-metal layer. The back-metal layer includes a hypoeutectoid steel including 0.07 to 0.35 mass % of carbon and has a structure including a ferrite phase and pearlite. According to the present invention, the back-metal layer includes a high ferrite phase portion at the bonding surface. A volume ratio Pc and a volume ratio Ps satisfy Ps/Pc≤0.4, where the volume ratio Pc is a volume ratio of pearlite in the structure at a center portion in a thickness direction of the back-metal layer, and the volume ratio Ps is a volume ratio of pearlite in the high ferrite phase portion.

According to an embodiment, the high ferrite phase portion preferably has a thickness T1 of 1 to 50 μm.

According to an embodiment, a ratio X1 (=T1/T) of the thickness T1 of the high ferrite phase portion in relation to a thickness T of the back-metal layer is preferably not more than 0.07.

According to an embodiment, the back-metal layer preferably includes 0.07 to 0.35 mass % of C, 0.4 mass % or less of Si, 1 mass % or less of Mn, 0.04 mass % or less of P, 0.05 mass % or less of S, and the balance of Fe and inevitable impurities. The copper alloy preferably includes 0.5 to 12 mass % of Sn, 0.01 to 0.2 mass % of P, and the balance of Cu and inevitable impurities. The copper alloy may further include one or more elements selected from 0.1 to 15 mass % of Ni, 0.5 to 10 mass % of Fe, 0.01 to 5 mass % of Al, 0.01 to 5 mass % of Si, 0.1 to 5 mass % of Mn, 0.1 to 30 mass % of Zn, 0.1 to 5 mass % of Sb, 0.1 to 5 mass % of In, 0.1 to 5 mass % of Ag, 0.5 to 25 mass % of Pb, and 0.5 to 20 mass % of Bi.

According to an embodiment, the sliding layer may include 0.1 to 10 volume % of hard particles composed of one or more selected from $Al_2O_3$, $SiO_2$, AlN, $MoS_2$, $WS_2$, $Fe_2P$, and $Fe_3P$, which are dispersed in a matrix of the copper alloy. The sliding layer may include 0.1 to 10 volume % of a solid lubricant composed of one or more selected from $MoS_2$, $WS_2$, graphite, and h-BN, which are dispersed in a matrix of the copper alloy. The sliding layer may include both the hard particles and the solid lubricant in the matrix of the copper alloy. Alternatively, the sliding layer may include either the hard particles or the solid lubricant alone.

According to the sliding member of the present invention, the high ferrite phase portion is positioned at the bonding surface of the back-metal layer, which is an interface between the back-metal layer and the sliding layer. The high ferrite phase portion has a volume ratio of the pearlite lower by not less than 60% than the volume ratio of the pearlite in the structure at the center portion in the thickness direction of the back-metal layer. A difference in elastic deformation between the ferrite phase and the copper alloy is small as compared with a difference in elastic deformation between the pearlite and the copper alloy. Accordingly, when an external force is applied to the sliding member, a difference in amount of elastic deformation is small at an interface between the copper alloy of the sliding layer and the high ferrite phase portion of the back-metal layer. Thus, shear is less likely to occur at the interface, and thus the copper alloy of the sliding layer is strongly bonded to the back-metal layer.

On the other hand, a portion of the back-metal layer except the high ferrite phase portion can ensure strength necessary for the back-metal layer. Except the high ferrite phase portion, the back-metal layer has a structure of a hypoeutectoid steel including a normal amount of pearlite, and thus has high strength. Accordingly, the sliding member is less likely to be plastically deformed by circumferential stress applied to the sliding member when the sliding member is fitted into a bearing housing or by circumferential force applied to the sliding member during operation of a bearing device.

DETAILED DESCRIPTION OF THE INVENTION

Figure 3:
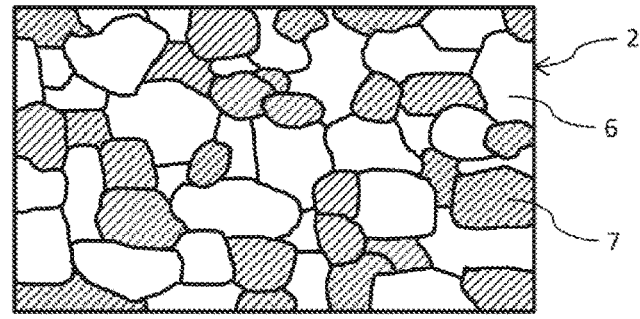
FIG. 3 is a schematic diagram of a cross-sectional structure at a center portion in a thickness direction of the back-metal layer illustrated in FIG. 1.
Figure 4:
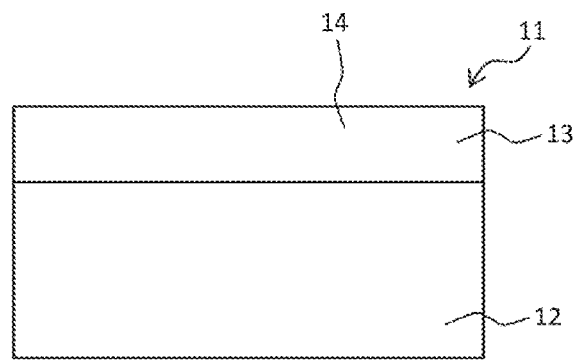
FIG. 4 is a schematic diagram of a cross section in a direction perpendicular to a sliding surface of a sliding layer of a conventional sliding member.

FIG. 4 is a schematic diagram illustrating a cross section of a conventional sliding member 11. The sliding member 11 is configured such that a sliding layer 13 of a copper alloy 14 is located on a surface of a back-metal layer 12. The back-metal layer 12 of a hypoeutectoid steel includes 0.07 to 0.35 mass % of carbon and has a normal structure of a hypoeutectoid steel (corresponding to a structure illustrated in FIG. 3). That is, the back-metal layer 12 has a structure including mainly a ferrite phase 6 and granular pearlite 7 is dispersed in a matrix of the ferrite phase. The back-metal layer 12 has a uniform structure throughout a thickness direction of the back-metal layer 12. Accordingly, the back-metal layer 12 has substantially uniform deformation resistance to an external force in the thickness direction of the back-metal layer 12.

As described above, during operation of a bearing device, a bearing housing is more likely to be elastically deformed by a dynamic load from a counter shaft member. In the conventional sliding member 11, therefore, a circumferential force which varies according to deformation of a bearing housing is applied to the sliding member (sliding bearing) fitted into a bearing holding hole of the bearing housing, and the force causes elastic deformation to the sliding member. In the conventional sliding member 11, the back-metal layer 12 has a normal structure of a hypoeutectoid steel. Thus, the back-metal layer 12 has higher strength and resultant higher deformation resistance than the copper alloy 14 of the sliding layer 13. Accordingly, a difference in amount of elastic deformation between the back-metal layer 12 and the copper alloy 14 of the sliding layer 13 is large at an interface between the back-metal layer 12 and the sliding layer 13. Thus, shear is more likely to occur between the back-metal layer 12 and the sliding layer 13.

Figure 1:
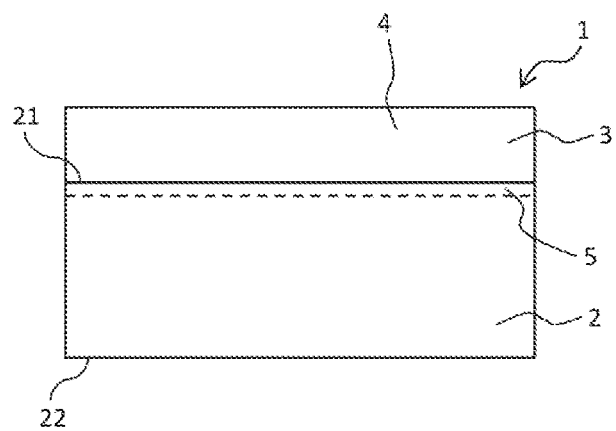
FIG. 1 is a schematic diagram of a cross section in a direction perpendicular to a sliding surface of a sliding layer of a sliding member according to the present invention.

An embodiment of a sliding member 1 according to the present invention will be described below with reference to FIGS. 1 to 3. FIG. 1 is a schematic diagram illustrating a cross section of the sliding member 1 including a sliding layer 3 including a copper alloy 4 located on a back-metal layer 2. The back-metal layer 2 has a surface (bonding surface 21) on which the sliding layer 3 is located and a back surface 22 opposite to the bonding surface 21. A high ferrite phase portion 5 (described below) is formed at the bonding surface 21 of the back-metal layer 2. The bonding surface 21 is an interface between the back-metal layer 2 and the copper alloy 4.

Figure 2:
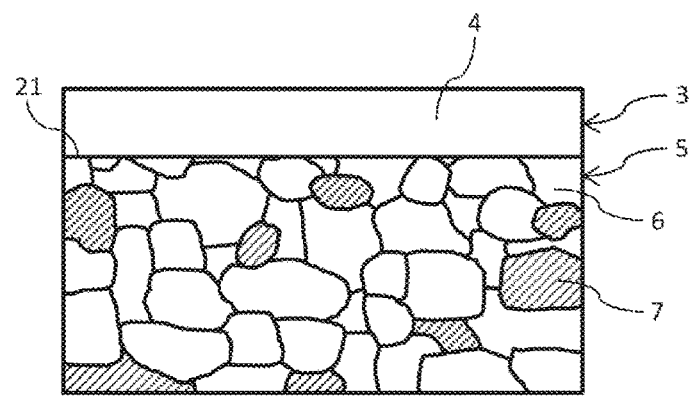
FIG. 2 is a schematic diagram of a cross-sectional structure of a high ferrite phase portion of a back-metal layer illustrated in FIG. 1.

FIG. 2 is an enlarged view illustrating a structure of the high ferrite phase portion 5 near the bonding surface 21 of the back-metal layer 2. FIG. 3 is an enlarged view illustrating a structure of a center portion in a thickness direction of the back-metal layer 2 (hereinafter simply referred to as "center portion of the back-metal layer 2"). For easier understanding, a ferrite phase 6 and pearlite 7 in the structure are exaggerated in FIGS. 2 and 3.

The back-metal layer 2 includes a hypoeutectoid steel including 0.07 to 0.35 mass % of carbon. The back-metal layer 2 has a structure including the ferrite phase 6 and the pearlite 7 as illustrated in FIG. 3. If the carbon content in the hypoeutectoid steel is less than 0.07 mass %, the back-metal layer 2 has low strength, and it causes insufficient strength of the sliding member 1. On the other hand, if the carbon content in the hypoeutectoid steel is more than 0.35 mass %, a ratio of the pearlite 7 in the high ferrite phase portion 5 of the back-metal layer 2 becomes low.

The back-metal layer 2 may include: 0.07 to 0.35 mass % of carbon; one or more elements selected from 0.4 mass % or less of Si, 1 mass % or less of Mn, 0.04 mass % or less of P, and 0.05 mass % or less of S; and the balance of Fe and inevitable impurities. The back-metal layer 2 has a structure including the ferrite phase 6 and the pearlite 7. This does not exclude that a structure of the back-metal layer 2 includes a fine precipitations, for example the fine precipitations undetectable when the structure is observed at a magnification of 1000 times with use of a scanning electron microscope.

Furthermore, in some cases, some elements of the copper alloy 4 (described later) may be diffused and solid-solved in the ferrite phase 6 near the bonding surface 21 (i.e. near a surface of the high ferrite phase portion 5) during second sintering (described later) which is an interface between the back-metal layer 2 and the sliding layer 3. Such cases are also included in the scope of the present invention.

A volume ratio Ps of the pearlite 7 in the structure of the high ferrite phase portion 5 is lower by not less than 60% than a volume ratio Pc of the pearlite 7 in the structure at the center portion of the back-metal layer 2. That is, a volume ratio Pc and a volume ratio Ps satisfy a relationship: Ps/Pc≤0.4.

The ferrite phase 6 includes a small amount of carbon, which is 0.02 mass % at a maximum. The ferrite phase 6 has a composition similar to that of pure iron. On the other hand, the pearlite 7 has a lamellar structure in which a ferrite phase and a cementite (iron carbide $Fe_3C$) phase are alternately arranged to form a thin plate. The pearlite 7 has higher strength than the ferrite phase 6. Thus, the back-metal layer 2 has higher deformation resistance, as a ratio of the pearlite 7 in the structure is higher. Since the volume ratio of the pearlite 7 in the structure of the high ferrite phase portion 5 is lower by not less than 60% than the volume ratio of the pearlite 7 in the structure at the center portion of the back-metal layer 2, the high ferrite phase portion 5 has lower deformation resistance than the center portion of the back-metal layer 2.

An area ratio of the pearlite 7 in the structure is measured by taking electronic images of the center portion of the back-metal layer 2 and a portion near the bonding surface 21 of the back-metal layer 2 in a plurality of cross-sectional portions (e.g., 5 portions) cut in a direction parallel to a thickness direction of the sliding member 1 (a direction perpendicular to a sliding surface of the sliding layer 3). The images are taken at a magnification of 500 times with use of an electron microscope, and measuring the area ratio of the pearlite 7 in the images with a general image analysis method (analysis software: Image-Pro Plus (Version 4.5) manufactured by Planetron, Inc.). When the area ratio of the pearlite 7 at the portion near the bonding surface of the back-metal layer 2 is lower by not less than 60% than the area ratio of the pearlite 7 in the structure at the center portion of the back-metal layer 2, it can be confirmed that the high ferrite phase portion 5 is located at the bonding surface 21 of the back-metal layer 2.

The center portion of the back-metal layer 2 does not need to be strictly a center position in the thickness direction of the back-metal layer 2. This is because a structure between the back surface 22 of the back-metal layer 2 and the high ferrite phase portion 5 is substantially uniform (with almost the same area ratio of the ferrite phase 6/the pearlite 7). Thus, the "center portion (in the thickness direction) of the back-metal layer 2" described herein includes the center position in the thickness direction of the back-metal layer 2 and a portion near the center position. In the above observation, the volume ratio of the pearlite 7 in the structure is measured as the area ratio in cross-sectional view. A value of the area ratio corresponds to a value of the volume ratio of the pearlite 7 in the structure.

The area ratio of the pearlite 7 at the surface (bonding surface 21) of the high ferrite phase portion 5 is preferably 0 to 2% in order to increase bonding strength between the sliding layer 3 and the high ferrite phase portion 5. The area ratio of the pearlite 7 at the surface of the high ferrite phase portion 5 can not be directly measured, but can be obtained by taking images of a plurality of portions of the cross-sectional structure by the same method described above and measuring a ratio of a length of a line included within the pearlite 7 in relation to an entire length of a line indicating the bonding surface 21 of the high ferrite phase portion 5 which is an interface between the high ferrite phase portion 5 and the sliding layer 3 in the images, with use of a general image analysis method (analysis software: Image-Pro Plus (Version 4.5) manufactured by Planetron, Inc.). This ratio corresponds to the area rate of the pearlite 7 at the surface of the high ferrite phase portion 5.

The high ferrite phase portion 5 preferably has a thickness T1 of 1 to 50 μm from the bonding surface 21. More preferably, the high ferrite phase portion 5 has a thickness T1 of 1 to 20 μm. If the high ferrite phase portion 5 has a thickness of less than 1 μm, the high ferrite phase portion 5 is not formed partially on the bonding surface 21 of the back-metal layer 2, in some cases. In a general sliding member, the back-metal layer 2 has a thickness of 0.7 mm at a minimum. Thus, when the high ferrite phase portion 5 has a thickness T1 of not more than 50 μm, strength of the back-metal layer 2 is little influenced by the thickness T1. Furthermore, a ratio X1 (X1=T1/T) of the thickness T1 of the high ferrite phase portion 5 in relation to a thickness T of the back-metal layer 2 is preferably not more than 0.07.

The copper alloy 4 of the sliding layer 3 may be a general copper alloy for a sliding member, and a composition thereof is not limited. For example, the copper alloy 4 includes 0.5 to 12 mass % of Sn, 0.01 to 0.2 mass % of P, and the balance of Cu and inevitable impurities. Sn and P have an effect of increasing strength of the copper alloy. If the Sn or P content is less than its lower limit, the effect is insufficient. If the Sn or P content is more than its upper limit, the copper alloy becomes brittle.

Alternatively, the copper alloy 4 may include: 0.5 to 12 mass % of Sn; 0.01 to 0.2 mass % of P; and one or more elements selected from 0.1 to 15 mass % of Ni, 0.5 to 10 mass % of Fe, 0.01 to 5 mass % of Al, 0.01 to 5 mass % of Si, 0.1 to 5 mass % of Mn, 0.1 to 30 mass % of Zn, 0.1 to 5 mass % of Sb, 0.1 to 5 mass % of In, 0.1 to 5 mass % of Ag, 0.5 to 25 mass % of Pb, and 0.5 to 20 mass % of Bi. Ni, Fe, Al, Si, Mn, Zn, Sb, In and Ag have an effect of increasing strength of the copper alloy 4. If the content of any of these elements is less than its lower limit, the effect is insufficient. If the content of any of these elements is more than its upper limit, the copper alloy 4 becomes brittle. Pb and Bi have an effect of increasing a lubricating property of the copper alloy 4. If the Pb or Bi content is less than its lower limit, the effect is insufficient. If the Pb or Bi content is more than its upper limit, the copper alloy 4 becomes brittle. When the copper alloy 4 includes two or more of these selected elements, a total amount of the elements is preferably not more than 40 mass %.

The sliding layer 3 may further include 0.1 to 10 volume % of hard particles composed of one or more selected from $Al_2O_3$, $SiO_2$, AlN, $Mo_2C$, WC, $Fe_2P$, and $Fe_3P$. The hard particles are dispersed in a matrix of the copper alloy 4 of the sliding layer 3 and have an effect of improving wear resistance of the sliding layer 3. If an amount of the hard particles is less than the lower limit, the effect is insufficient. If the amount of the hard particles is more than the upper limit, the sliding layer 3 becomes brittle.

The sliding layer 3 may further include 0.1 to 10 volume % of a solid lubricant composed of one or more selected from $MoS_2$, $WS_2$, graphite, and h-BN. The solid lubricant particles are dispersed in the matrix of the copper alloy 4 of the sliding layer 3 and have an effect of improving a lubricating property of the sliding layer 3. If an amount of the solid lubricant is less than the lower limit, the effect is insufficient. If the amount of the solid lubricant content is more than the upper limit, the sliding layer 3 becomes brittle.

The back-metal layer 2 includes a hypoeutectoid steel including 0.07 to 0.35 mass % of carbon. The hypoeutectoid steel has a structure including a ferrite phase 6 and pearlite 7. A ratio of the pearlite 7 is determined according to the carbon content and is normally not more than 30 volume %. The center portion of the back-metal layer 2 has such a normal structure of the hypoeutectoid steel. However, at the bonding surface 21 of the back-metal layer 2, which is an interface between the back-metal layer 2 and the sliding layer 3, the high ferrite phase portion 5 is formed in which a volume ratio of the pearlite 7 is lower by not less than 60% than a volume ratio of the pearlite 7 in the structure at the center portion of the back-metal layer. The high ferrite phase portion 5 has lower deformation resistance than other regions (especially, near the center portion) of the back-metal layer 2. Thus, even when a circumferential force due to elastic deformation of a bearing housing is applied to the sliding member 1 used in a bearing device to cause elastically deformation in the sliding member 1, a difference in deformation resistance between the copper alloy 4 of the sliding layer 3 and the high ferrite phase portion 5 of the back-metal layer 2 is small at the interface, thereby a difference in amount of elastic deformation therebetween is small. Accordingly, shear is less likely to occur at the interface between the back-metal layer 2 and the sliding layer 3.

A method of producing the sliding member according to the present embodiment will be described below.

First, a copper alloy powder having the composition described above for a sliding layer is prepared. When a sliding layer includes the hard particles and/or the solid lubricant, a mixed powder of the copper alloy powder and the hard particles and/or the solid lubricant particles is produced.

The prepared copper alloy powder or mixed powder is scattered on a steel (hypoeutectoid steel) plate having the composition described above. Then, it is first-sintered in a sintering furnace in a reducing atmosphere at a temperature of 800° C. to 950° C. without applying pressure to the scattered powder, to form a porous copper alloy layer on the steel plate. Then, the copper alloy layer is cooled to a room temperature.

Next, the porous copper alloy layer on the steel plate is subjected to first-rolling in order to make the porous layer dense and activate a region near a surface of the steel plate in contact with the copper alloy layer. In a conventional process of production of a sliding member, first rolling has been performed in order to reduce pores and dense a porous copper alloy layer, buts a steel plate has been hardly rolled. In the production of the sliding member according to the present invention, however, a reduction in the first rolling is increased as compared with the conventional one, and the rolling is further proceeded after the porous copper alloy layer is densified. The porous copper alloy layer before the first-rolling has lower hardness than the steel plate. Until the porous copper alloy layer has been densified in the first rolling, only the porous copper alloy layer is plastically deformed and thus can be sufficiently work hardened. When the densified and work-hardened copper alloy layer is further rolled, the hardness of the copper alloy layer and that of the steel plate are reversed, so that the copper alloy layer has higher hardness than the steel plate (e.g., a surface of the densified copper alloy layer subjected to the first rolling has a Vickers hardness (Hv) higher by approximately 20 HV than a Vickers hardness of a back surface of the steel plate). Thus, the steel plate is also rolled in the rolling. Accordingly, in the first rolling, more strain is introduced in the region near the surface of the steel plate in contact with the hardened copper alloy layer than an inner portion of the steel plate, thereby the region becomes in an active state.

Next, the rolled member is subjected to second sintering in the sintering furnace in a reducing atmosphere at a temperature of 800° C. to 950° C. to sinter the copper alloy layer, and is then cooled to a room temperature. At this point, a high ferrite phase portion is formed at a surface of the back-metal layer, which surface is an interface between the back-metal layer and the copper alloy layer.

It is presumed that the high ferrite phase portion is formed by a mechanism below.

Before the back-metal layer (the steel plate) of the rolled member reaches an A1 transformation point (727° C.) during heating in the second sintering step, a recrystallization occurs earlier at a region near a bonding surface of the back-metal layer which is the interface between the back-metal layer and the copper alloy layer, since the region is in a more active state than the inner portion of the back-metal layer. Accordingly, immediately before the temperature reaches the A1 transformation point, a ratio of a ferrite phase and pearlite is not different between the structure of the portion near the bonding surface and that of the inner portion of the back-metal layer. However, a size of grains of the ferrite phase is larger at the region near the surface of the back-metal layer than those at the inner portion.

When the back-metal layer reaches the A1 transformation point, the pearlite transforms into an austenitic phase, so that the back-metal layer has a structure including the ferrite phase and the austenitic phase (immediately after the temperature reaches the A1 transformation point, there is no difference in a ratio of the austenitic phase in the structure and concentration of carbon atoms solid-solved in the austenitic phase between the region near the bonding surface and the inner portion). Then, as the temperature rises beyond the A1 transformation point to a A3 transformation point (at which the structure becomes a single austenitic phase), the ferrite phase gradually transforms into an austenitic phase, so that the ratio of the ferrite phase in the structure is reducing.

The ferrite phase at the region near the bonding surface of the back-metal layer has a larger grain size and is more stable than that at the inner portion of the back-metal layer, and is thus less likely to be transformed into an austenitic phase. During the heating, the ratio of the austenitic phase in the structure at the region near the surface is always lower than the ratio at the inner portion.

Carbon atoms hardly solid-solute in the ferrite phase (approximately 0.02 mass % C solid-solve a maximum). Thus, carbon atoms included in the pearlite are solid-solved in the austenitic phase that present by a smaller amount (volume) at the region near the surface than at the inner portion of the back-metal layer. This causes a difference in concentration of carbon atoms in the austenitic phase between at the region near the surface and at the inner portion of the back-metal layer. In order to reduce the difference, carbon atoms in the austenitic phase at the region near the surface diffuse into the austenitic phase of the inner portion of the back-metal layer. Thus, the amount of carbon at the region near the surface becomes smaller than that at the inner portion of the back-metal layer.

Then, when the back-metal layer reaches the A1 transformation point during cooling, its structure transforms into a ferrite phase and pearlite. After the cooling, the volume ratio of the pearlite in the structure at the region near the surface becomes lower than that at the inner portion of the back-metal layer for the following reasons. That is, as described above, during the temperature rise, (i) the amount of carbon included at the region near the bonding surface is smaller than the amount of carbon at the inner portion, and (ii) during the temperature rise, the volume ratio of the ferrite phase remaining in the structure is different between the region near the surface and the inner portion.

In the conventional production, the first rolling is performed only to such an extent that the porous copper alloy layer is densified and the back-metal layer is not rolled. Thus, more strain is not introduced into the region near the interface of the back-metal layer (the steel plate) with the densified copper alloy layer than in the inner portion of the back-metal layer, and the region near the interface is not in an active state. Thus, after the subsequent second sintering step, there is no difference in the volume ratio of the pearlite between the region near the surface and the inner portion of the back-metal layer.

Furthermore, (as disclosed in JP 2006-22869A) when a member including a copper alloy layer and a back-metal layer is subjected to the second sintering after the rolling for densification is further subjected to second rolling to roll the copper alloy layer and the back-metal layer together, only the copper alloy layer is plastic deformed (hardened) in the second rolling, since hardness of the copper alloy has already become lower than that of the back-metal layer by heat treatment in the second sintering and also the copper alloy layer has already been densified. Thus, it does not occur that the copper alloy layer is more sufficiently hardened than the back-metal during the second rolling. Thus, more strain is not introduced into the region near the interface of the back-metal layer (steel plate) with the densified copper alloy layer than in the inner portion of the back-metal layer, and the region near the interface is not in an active state. Therefore, even when the rolled member is subjected to third sintering under the same condition as the sintering conditions of the second sintering step, there is no difference in the ratio of the pearlite between at the region near the surface and in the inner portion of the back-metal layer.

The sliding member of the present invention is not limited to a bearing for an internal combustion engine and an automatic transmission, but can be applied to a bearing for various machines. Furthermore, a shape of the bearing is not limited to a cylindrical shape or a semi-cylindrical shape. For example, the sliding member of the present invention can also be applied to an annular shaped or semi-annular shaped thrust bearing for bearing an axial load of a shaft member or an annular shaped end plate having a substantially U-shaped cross section for a clutch (one-way clutch) of an automatic transmission.

Furthermore, the sliding member of the present invention may have a coating layer on the surface of the sliding layer and/or the back-metal layer. The coating layer may include Sn, Bi, or Pb or an alloy based on these metals, or include synthetic resin, or the coating layer may be based on synthetic resin. (Please note that a surface of the sliding layer is referred to as a "sliding surface" in this description, even when the coating layer is applied to the surface of the sliding layer.)

The invention claimed is:

1. A sliding member comprising:
   a back-metal layer having a back surface and a bonding surface; and
   a sliding layer comprising a copper alloy on the bonding surface of the back-metal layer,
   wherein the back-metal layer comprises a hypoeutectoid steel including 0.07 to 0.35 mass % of carbon and has a structure comprising a ferrite phase and pearlite,
   wherein the back-metal layer comprises a high ferrite phase portion at the bonding surface, and
   wherein a volume ratio Pc and a volume ratio Ps satisfy $Ps/Pc \leq 0.4$ where the volume ratio Pc is a volume ratio of pearlite in the structure at a center portion in a thickness direction of the back-metal layer, and the volume ratio Ps is a volume ratio of pearlite in the high ferrite phase portion, and
   wherein the back-metal layer consists of 0.07 to 0.35 mass % of C, not more than 0.4 mass % of Si, not more than 1 mass % of Mn, not more than 0.04 mass % of P, not more than 0.05 mass % of S, and a balance of Fe and inevitable impurities.

2. The sliding member according to claim 1, wherein the high ferrite phase portion has a thickness T1 of 1 to 50 μm.

3. The sliding member according to claim 1, wherein a ratio X1 of a thickness T1 of the high ferrite phase portion in relation to a thickness T of the back-metal layer is not more than 0.07.

4. The sliding member according to claim 1, wherein the copper alloy comprises 0.5 to 12 mass % of Sn, 0.01 to 0.2 mass % of P, and the balance of Cu and inevitable impurities.

5. The sliding member according to claim 4, wherein the copper alloy further includes one or more elements selected from 0.1 to 15 mass % of Ni, 0.5 to 10 mass % of Fe, 0.01 to 5 mass % of Al, 0.01 to 5 mass % of Si, 0.1 to 5 mass % of Mn, 0.1 to 30 mass % of Zn, 0.1 to 5 mass % of Sb, 0.1 to 5 mass % of In, 0.1 to 5 mass % of Ag, 0.5 to 25 mass % of Pb, and 0.5 to 20 mass % of Bi.

6. The sliding member according to claim 1, wherein the sliding layer further includes 0.1 to 10 volume % of hard particles composed of one or more selected from $Al_2O_3$, $SiO_2$, AlN, $Mo_2C$, WC, $Fe_2P$, and $Fe_3P$, the hard particles being dispersed in a matrix of the copper alloy.

7. The sliding member according to claim 1, wherein, the sliding layer further includes 0.1 to 10 volume % of a solid lubricant composed of one or more selected from $MoS_2$, $WS_2$, graphite, and h-BN, the lubricant being dispersed in a matrix of the copper alloy.

* * * * *